United States Patent [19]

Harrison

[11] Patent Number: 4,584,603
[45] Date of Patent: Apr. 22, 1986

[54] AMUSEMENT AND INFORMATION SYSTEM FOR USE ON A PASSENGER CARRIER

[76] Inventor: Elden D. Harrison, 674 Shore Dr., Joppa, Md. 21085

[21] Appl. No.: 662,479

[22] Filed: Oct. 19, 1984

[51] Int. Cl.$^4$ .............................. H04N 7/00; A47C 762
[52] U.S. Cl. ........................................ 358/86; 455/3; 340/988; 297/163; 297/191; 358/254
[58] Field of Search ................ 358/86, 254, 255, 115; 455/3, 6; 297/146, 163, 191; D14/79; 340/988, 995, 996

[56] References Cited

U.S. PATENT DOCUMENTS

| | | | |
|---|---|---|---|
| 3,795,422 | 3/1974 | Robinson et al. | 297/191 |
| 4,008,369 | 2/1977 | Theurer | 358/86 X |
| 4,057,829 | 11/1977 | Moorehead | 358/86 |
| 4,521,021 | 6/1985 | Dixon | 358/254 X |
| 4,528,597 | 7/1985 | Klein et al. | 358/254 |

FOREIGN PATENT DOCUMENTS

| | | | |
|---|---|---|---|
| 57-199369 | 12/1982 | Japan | 358/86 |
| 8500911 | 2/1985 | PCT Int'l Appl. | 340/995 |
| 2059225 | 4/1981 | United Kingdom | 455/3 |

*Primary Examiner*—Keith E. George

[57] ABSTRACT

The invention concerns an amusement and information system for use particularly on airlines. On each seat back is mounted an entertainment terminal including a keyboard and video display for use by the occupant of a subsequent seat. The keyboard provides access to video games and movies, and flight path and crew information. A clear, lens-like tray is provided such that in an upright position the display is visible through the tray while in the downward position the tray supports food, drinks, etc.

8 Claims, 4 Drawing Figures

AMUSEMENT AND INFORMATION SYSTEM FOR USE ON A PASSENGER CARRIER

BACKGROUND OF THE INVENTION

The invention concerns an amusement and information system for use by passengers on commercial carriers (air lines, railroads, busses) from which different entertainment may be selected.

Selective viewing, per se, is known as in U.S. Pat. No. 4,381,522 to Lambert, wherein a telephone is dialed to select from a listing of programs available to a remote receiving location from which the dialing is completed. U.S. Pat. No. 4,450,477 to Lovett teaches a television information system in which subscribers transmit to a computer a video request for desired information which is processed such that the information is generated to the subscriber. Templin et al. disclose in U.S. Pat. No. 4,375,651 a selective video reception system. Here, groups of VHF, UHF or CATV channels are programmed by a key switch, and individual channels within the groups may be selected by means of selector keys. A communication network having master and remote stations, each having a television receiver to which a common video tape recorder may be selectively connected, is shown in Roscoe's U.S. Pat. No. 4,249,206. U.S. Pat. No. 4,028,733 to Ulicki discusses a system for providing a video display of a pictorial information message on a video display device.

Passenger rail cars and busses typically provide no entertainment for the passengers who must amuse themselves by reading, for instance. On some airlines a movie is provided, however, the passengers have a choice only between watching or not watching a pre-selected movie. An airliner may also have a selection of audio tapes are available to the passengers for listening. Generally, a substantial amount of time is spent peering from the airliner window at the scenery below.

OBJECTS AND SUMMARY OF THE INVENTION

It is a first objection of this invention to provide an amusement and information system for simultaneous use by many people.

It is another object of this invention to provide an amusement and information system which allows the individual user to choose between different amusement and information devices.

A further object of the invention is to provide an amusement and information system for use on a passenger carrier, which when installed consumes a negligible amount of space.

Each seat of a passenger carrier, such as an aircraft, is provided with an entertainment terminal which informs and amuses the seat occupant. The entertainment terminal having a display and keyboard is attached and positioned in the back of the first seat in a manner similar to currently used drop-trays, for operation by a person sitting in a second seat behind the first seat. The keyboard is used to select from a wide variety of entertainment, such as games, movies, current flight path information, crew information or to signal that the assistance of a crew member is desired. A proper keying sequence connects an occupant's video display to one of many video movie players, allowing the occupant to view a movie of his choice. Another sequence keyed via the keyboard yields a choice of pre-programmed video games. The occupant may also key for personal information concerning the flight crew; name, rank, flight experience. When flying most passengers cannot identify a city which passes below, but often wonder as to its identity. Accordingly, the occupant may key for flight path information. The name of the city, its relative size, and a map may be generated which locates and identifies points of interest. The flight crew and path information, and video movies and games are accessed through a selector which interprets the keyed sequence. A single key on the keyboard is used for summoning a flight attendant to obtain food, drink, etc. Actuation of this key illuminates an attendant's video panel in a manner that indicates which occupant actuated his or her key. The keyboard and video display are mounted in a seat back, the keyboard being pivotable away from the seat to a horizontal position. A clear lens-like tray parallels the seat back and covers the video display. Thus, the display is entirely visible through the vertically positioned clear tray. In a horizontal position, the clear tray functions as a table to hold food, drinks, etc. while the video display is viewed directly.

DETAILED DESCRIPTION OF THE INVENTION

Figure 1:
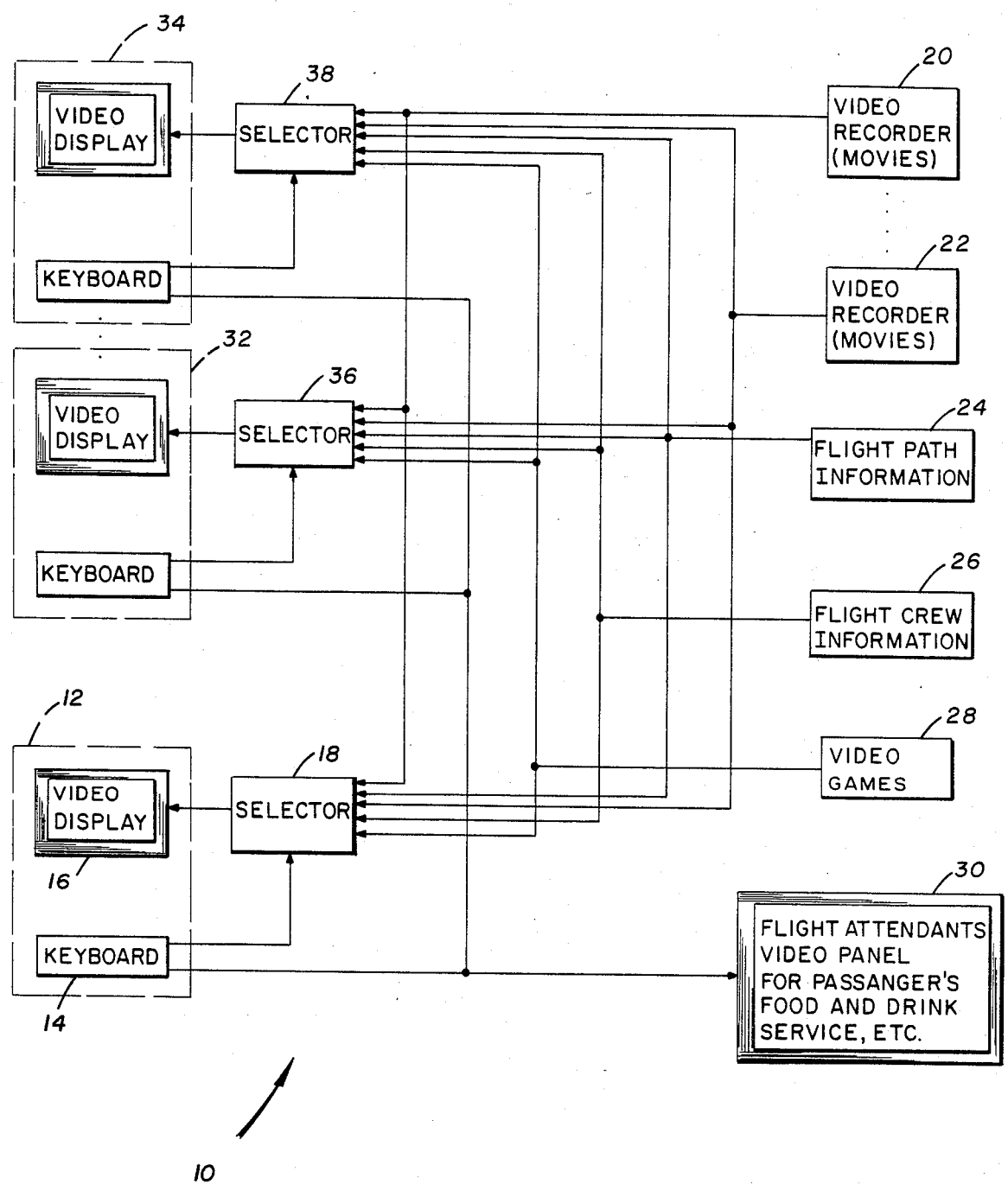
FIG. 1 shows a block diagram of the amusement and information system.

FIG. 1 shows a block diagram of the amusement and information system, generally indicated at 10. Included in the system 10 is an entertainment terminal 12 (typical of a plurality) having a keyboard 14 which is used to select the amusement or information which appears on video display 16. Keys (now shown) of the keyboard 14 are actuated in a pre-determined sequence, in a manner which determines the operation of selector 18. In effect, the keyboard 14 "gates" the selector 18, allowing amusement or information to be displayed on the video display 16. According to the keyed sequence, any one of a plurality of entertainment devices may be accessed. The selector 18 associated with each entertainment terminal 12 is connected to a plurality of video recorder/players 20, 22, etc. According to the preferred embodiment of the invention, each video recorder/player 20, 22, etc. is used to show a different movie. Thus, the seat occupant, depending on the appropriate keying sequence, may select from a number of movies, rather than, as is the present practice, view one movie chosen by the airline. Another different keying sequence is utilized to access a flight path information computer 24. Generated on the video display 16 will be, for instance, the name of a city below the airliner, its population, relative size and a map of the city. The map may contain points of interest that are visible from the air. The information in the flight path information computer is updated as the flight progresses so that the data appearing on the video display 16 corresponds with the city or terrain that is below the aircraft. Appropriate codes are typed into the keyboard 14 and the selector 18 now connects the video display 16 to the flight crew data memory 26. Information concerning the flight crew is stored in memory at 26. A seat occupant may determine the names, rank and flight experience of the crew members. Any amount of personal information may be stored, however, the privacy of the crew is to be taken into consideration. A digital storage device 28 may be connected to the video display 16 by the selector 18 in accordance with a keying sequence, providing a choice of video games. In this instance the keyboard also functions to control the movement of any characters which appear in the game. A special, single key appearing on each keyboard 14 may be actuated which is directly connected to a flight attendant's video panel. Actuation of this key indicates to a flight attendant that the actuator/occupant desires the assistance of the flight attendant. An appropriate signal, such as a seat number, appears on the panel 30 so that the flight attendant is aware of the assistance-needing passenger. A series of other entertainment terminals 32, 34 are connected in a similar fashion via their respective selectors 36, 38 to the amusement and information devices. Thus, the devices (20, 22, 24, 26, and 28) may be accessed by any number of passengers having an entertainment terminal.

Figure 2:
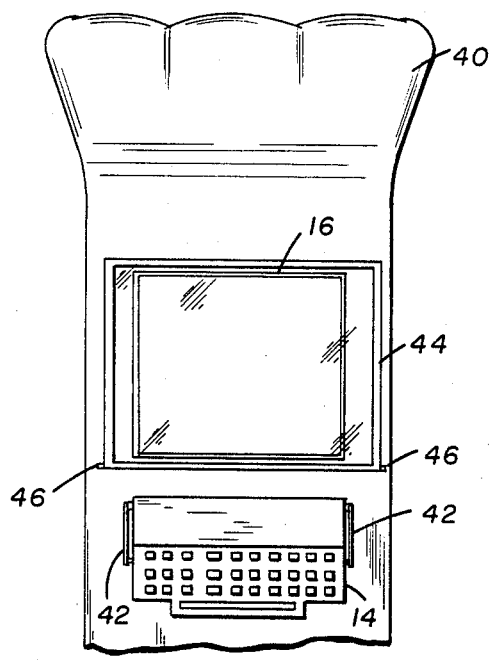
FIG. 2 shows a front view of an entertainment terminal mounted in a seat back.

In FIG. 2 the back 40 of an airline seat is shown, to which an entertainment system terminal 12 is attached. The video display 16 is integrally connected to the seat back 40 and is parallel thereto. The keyboard 14, in this embodiment, is mounted to the seat back 40 below the video display 16. The keyboard 14 is shown in a vertical position (for aircraft take-off and landing) secured to the seat back 40 by hinge members 42. A clear, lens-like tray 44 is shown in an upright position, through which the video display 16 can be seen. The clear tray 44 is attached to the seat back 40 in a manner similar to that of typical drop-trays. As an example, the clear tray is hinged at 46.

Figure 3:
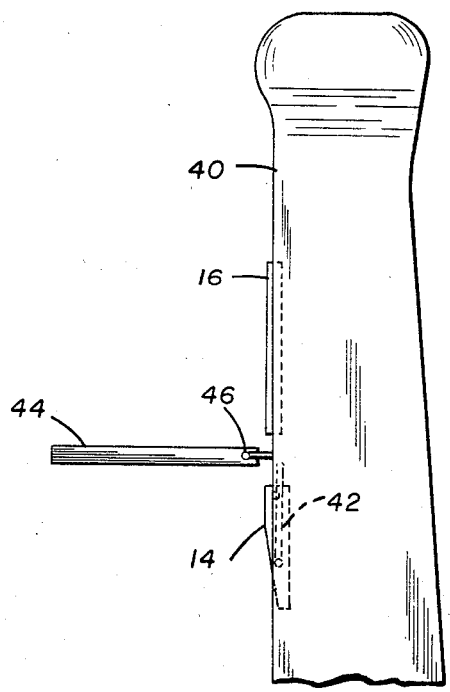
FIG. 3 shows a side view of the FIG. 2 seat with the clear tray in a horizontal position.

FIG. 3 shows a side view of the seat back 40, but with the clear tray in a horizontal position. In this position the clear tray 44 functions as a drop-tray, being a support for food, drinks, etc. The video display 16 may be viewed directly in a normal manner.

Figure 4:
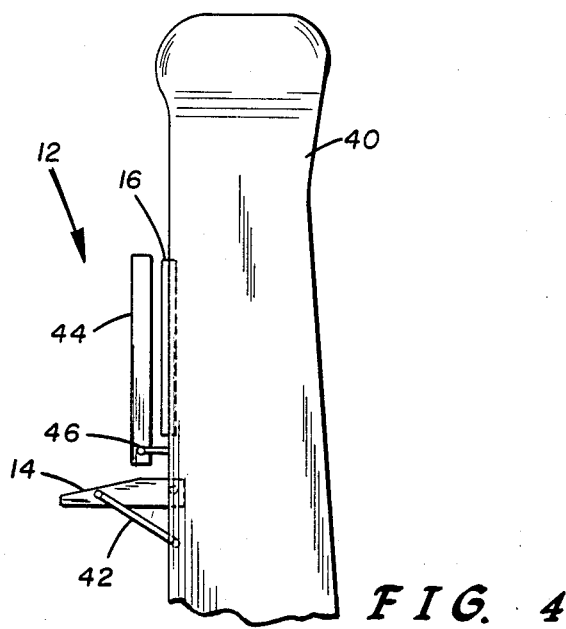
FIG. 4 also shows a side view, however, with the keyboard extended.

FIG. 4 shows the entertainment terminal 12, oriented for operation. Here, the keyboard 14 is pivoted to a horizontal position about its hinged member 42. The clear tray 44 parallels the video display 16 which is viewed therethrough. Accordingly, the seat occupant keys in a desired sequence on keyboard 14, a video movie or game, or flight crew or path information appearing on the video display 16. The lens-like quality of the clear tray 44 provides an unobstructed view of the video display 16, and may be designed to magnify the images thereon. In an alternate embodiment, the keyboard 14 may be attached to the seat back 40 above the video display 16 so that an occupant may utilize the tray in its horizontal position while operating the entertainment terminal.

Other modifications are apparent to one skilled in the art, which do not depart from the spirit of the present invention. The scope of the invention being defined by the appended claims.

What is claimed is:

1. An amusement and information system for use on a passenger carrier including:
    a plurality of seats, each having a seat rear, on the passenger carrier;
    a plurality of video displays, each mounted integral with and parallel to a corresponding rear of a single seat of the plurality of seats;
    a plurality of keying means, each connected to a corresponding single video display of the plurality of video displays, for actuating the video means; and
    a plurality of positionable, clear material trays, each of the trays connected to a corresponding single seat rear of the plurality of seats, wherein: in a first position a single tray covers the corresponding single video means and through which the corresponding single video means is visible; and with the single tray in a second position, the corresponding single video means is directly visible.

2. A system as defined in claim 1, the keying means comprising a movable keyboard which is hinged to the seat and is movable from a vertical to a horizontal position.

3. A system as defined in claim 2, wherein each entertainment terminal is connected to a plurality of video recorder/players such that a pre-determined keying sequence electrically accesses one of the plurality of video recordings/players by the entertainment terminal.

4. A system as defined in claim 3, the plurality of entertainment terminals connected to a digital storage device in which video games are stored and from which one video game is selected by keying the keyboard.

5. A system as in claim 4, the plurality of entertainment terminals connected to a memory means that holds flight crew data and is connected to be accessed by the keyboard.

6. A system as defined in claim 5, the plurality of entertainment terminals connected to a flight path information computer which is keyed to generate information based on the current position of the passenger carrier.

7. A system as defined in claim 6 including a flight attendant video panel, the keyboard having one key connected to the flight attendant video panel, for summoning a flight attendant.

8. A system as defined in claim 7 having a plurality of selectors, each connected to an associated video display between an associated keyboard and: the plurality of video recorder/players, the digital storage device, the memory means, and the flight path information computer; wherein the selector interprets the keying sequence generated on the keyboard to connect the video display to any one of the plurality of video recorder/players, the digital storage device, the memory means and the flight path information computer.

* * * * *